United States Patent [19]

Lee

[11] Patent Number: 4,936,598

[45] Date of Patent: Jun. 26, 1990

[54] GOLF CART

[75] Inventor: Ching C. Lee, Taipei, Taiwan

[73] Assignee: Sun Son Aluminum Factory Co., Ltd., Taipei, Taiwan

[21] Appl. No.: 331,062

[22] Filed: Mar. 28, 1989

Related U.S. Application Data

[63] Continuation of Ser. No. 114,726, Oct. 30, 1987, abandoned.

[51] Int. Cl.⁵ .............................. B62B 3/02; B62B 3/10
[52] U.S. Cl. .................................. 280/645; 280/47.27; 280/DIG. 6; 248/96; 224/919; 301/112; 301/132
[58] Field of Search ................. 280/DIG. 6, 639, 641, 280/47.24, 47.27, 652, 654, 645, 37; 248/96; 224/919; 403/154, 330, 326; 301/132, 131, 112, 120, 121, 119

[56] References Cited

U.S. PATENT DOCUMENTS

| | | | |
|---|---|---|---|
| 748,993 | 1/1904 | Southard | 301/119 |
| 1,911,256 | 5/1933 | Andrew | 224/919 |
| 2,411,965 | 12/1946 | Hartung | 280/DIG. 6 X |
| 2,761,691 | 9/1956 | George | 280/DIG. 6 X |
| 3,497,118 | 2/1970 | Najjar | 224/919 X |
| 4,151,936 | 5/1979 | Hawkes | 224/919 X |
| 4,340,236 | 7/1982 | Seibold et al. | 280/645 X |
| 4,503,651 | 3/1985 | Pugh | 403/330 X |
| 4,582,448 | 4/1986 | Costello et al. | 301/132 X |

FOREIGN PATENT DOCUMENTS

| | | | |
|---|---|---|---|
| 573899 | 4/1959 | Canada | 224/919 |
| 730590 | 3/1966 | Canada | 280/DIG. 6 |
| 2469936 | 5/1981 | France | 224/919 |
| 824697 | 12/1959 | United Kingdom | 280/DIG. 6 |

*Primary Examiner*—Charles A. Marmor
*Assistant Examiner*—Tamara L. Finlay
*Attorney, Agent, or Firm*—Danton K. Mak

[57] ABSTRACT

An improved golf cart mainly comprises a pair of grips, a grip-supporting-rod, a fixing seat for the grip supporting rod, an upper-fixing-member for a golf bag, a collapsible frame, a pair of wheels and a set of wheel supports. The grip can receive a golf ball and a plurality of golf tees. The upper-fixing-member for holding a golf bag can receive a plurality of golf balls. The inclination of the grip-supporting-rod is adjustable. The central components of the collapsible frame are disposed in a hollow supporting rod both to prevent the user from being hurt and to increase the component's durability. The wheels and its supports are simplified as well for easy operation.

22 Claims, 11 Drawing Sheets

GOLF CART

This application is a continuation of application Ser. No. 114,726, filed Oct. 30, 1987, abandoned.

BACKGROUND OF THE INVENTION

The present invention generally relates to a golf cart and more particularly to one which has improvements in many respects including the grip, the grip-supporting-rod and its fixing seat, the upper-fixing-member for a golf bag, the collapsible cart frame and the fastening means of the wheels.

Conventional golf carts have the following disadvantages:

1. The known grip-supporting-rod for a golf cart is unadjustable so that the inclination of the grip-supporting-rod is fixed. However, since each golfer has his own height and arm length, the fixed inclination of the grip-supporting-rod is by no means practical for use.

2. The control components of the known collapsible frame for a golf cart usually are mounted to the external portion of the golf cart. However, such an arrangement may easily hurt the golfer when he intends to collapse the cart. In addition, the slidable elements, such as a sleeve and the like, are loosely mounted to the supporting rod to be able to slide therealong. However, such an arrangement makes the strength of the structure insufficient so that the elements thereof will be easily damaged.

3. The connection between the wheels and the supporting frame of a known golf cart is complicated so that its assembly and disassembly will be difficult. Furthermore, the space required for storing the collapsed golf cart is relatively large.

It is, therefore, an object of the present invention to obviate and mitigate the aforesaid drawbacks.

SUMMARY OF THE INVENTION

It is the primary object of the present invention to provide an improved golf cart which comprises a pair of grips of which one end of each grip extends outward to form a flexible semi-spherical socket such that a golf ball can be received in the socket, and the side wall of the grip has a plurality of holes, each being designed to receive a golf tee.

It is another object of the present invention to provide an improved golf cart wherein a grip-supporting-rod is moveably joined with its fixing seat and one end of the fixing seat is mounted to a central supporting rod while the other end thereof is formed with a pair of parallel extensions symmetrical to each other, and each extension has a plurality of recesses at its upper edge such that the grip supporting rod can engage with or disengage from one of said recesses with the aid of a moveable member to alter the inclination of the grip supporting rod.

It is a further object of the present invention to provide an improved golf cart which comprises a V-shaped upper-fixing-member for holding a golf bag in the front. The two opposite wings of said upper-fixing-member are designed to accommodate a plurality of golf balls therebetween.

It is a still further object of the present invention to provide an improved golf cart which comprises a collapsible frame of which the control components are disposed in a hollow supporting rod both to ensure the operating security and to improve the durability of the components.

It is a still further object of the present invention to provide an improved golf cart, wherein each wheel together with its axle are connected to the collapsible frame by a metal plate assembly such that a moveable element and a spring of said metal plate assembly can cooperate with a latch slot of the axle to engage the wheel with or disengage the same from the collapsible frame.

DETAILED DESCRIPTION OF THE PREFERRED EMBODIMENT

Figure 1:
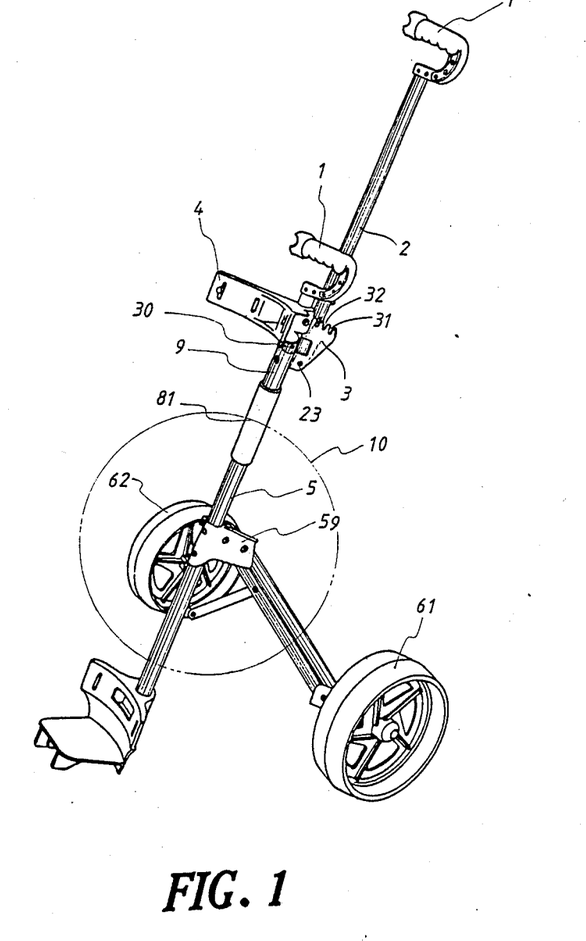
FIG. 1 is a perspective view of a golf cart in accordance with a preferred embodiment of the present invention.

Referring to FIG. 1, a golf cart in accordance with the present invention mainly comprises a pair of grips (1) and (1'), a grip-supporting-rod (2), a fixing seat (3) for the grip-supporting-rod, an upper-fixing-member (4) for holding a golf bag (not shown), a collapsible frame (10), a pair of wheels (61) and (62), and a metal plate assembly (63).

Figure 2:
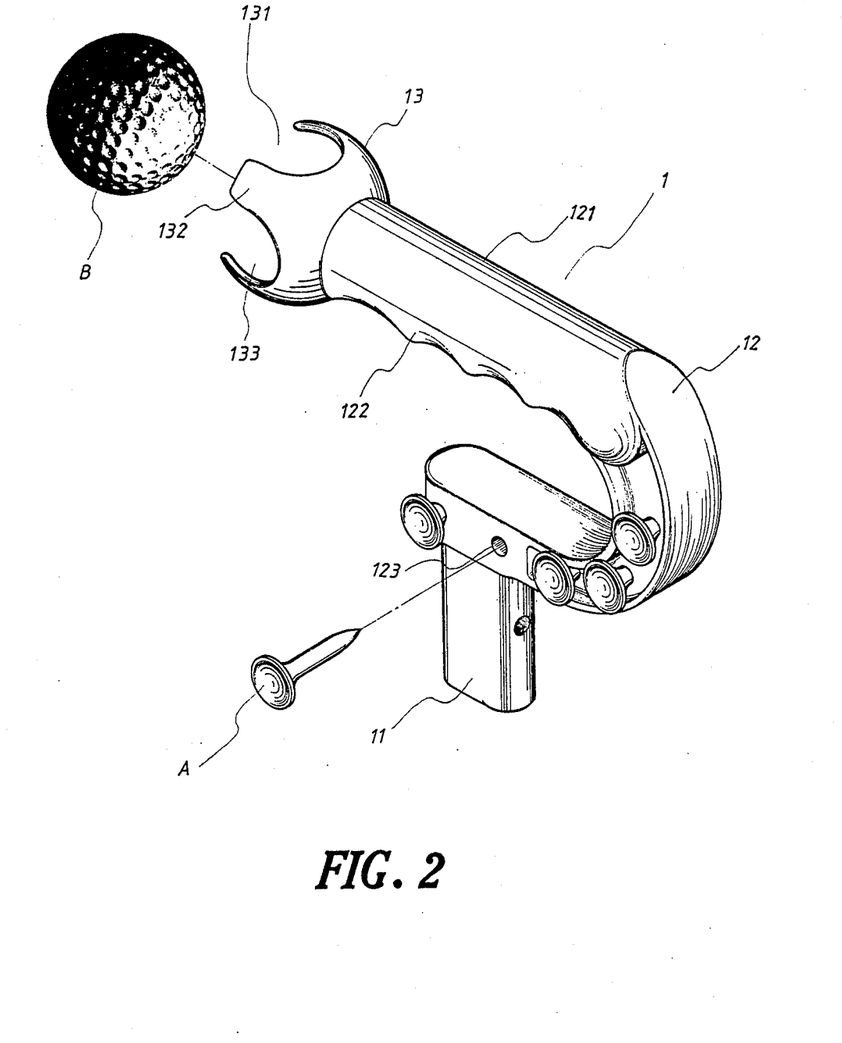
FIG. 2 is a perspective view of a grip in accordance with the present invention.

As shown in FIG. 2, the grip (1) comprises a U-shaped body (12) which extends downward to form an insert portion (11) by which the grip (1) can be mounted to the grip-supporting-rod (2) or to an upper central supporting rod (9). The grip (1) has at its upper portion a horizontal handle portion (121) which is formed at its lower side with a corrugated portion (122) to facilitate the gripping. One end of the handle portion (121) extends outward to form a semi-spherical seat (13), the interior of which seat is formed with a hollow chamber (131). The semi-spherical seat (13) has a plurality of recesses (133) which are designed to facilitate the picking up of a golf ball (B) from the hollow chamber (131). A further function of the recesses (133) is to have the semi-spherical seat (13) formed at its upper portion with elasticity and with a plurality of fingers (132). This function makes the semi-spherical seat (13) more flexible to be able to hold the golf balls with different diameters (which difference is about 1.5 mm). The U-shaped-body (12) is formed at its side with a plurality of holes (123) each being arranged to receive a golf tee (A).

Figure 3:
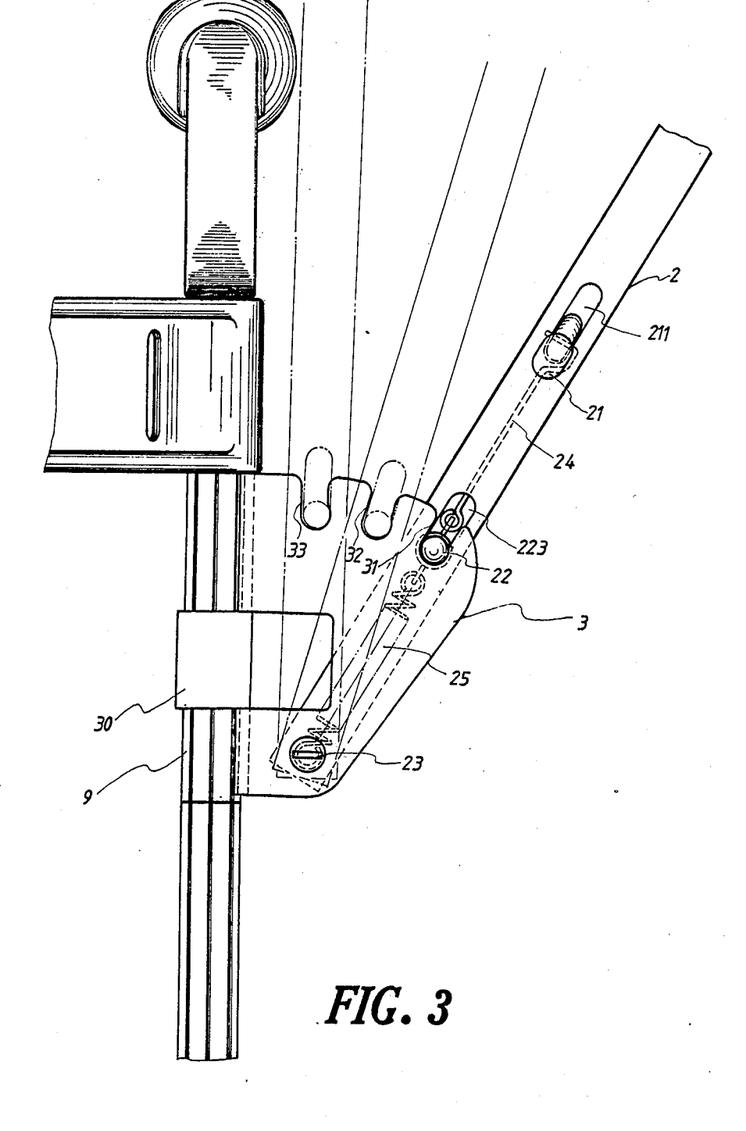
FIG. 3 is a schematic view showing the combination between a grip-supporting-rod and its fixing seat.

Referring to FIG. 3, the fixing seat (3) for grip-supporting-rod is provided at one end with a sleeve (30) by which the fixing seat (3) can be disposed on the upper central supporting rod (9). The other end of the fixing seat (3) extends outward to form a pair of sectional portions symmetrical to each other. Each sectional portion has a plurality of recesses (31), (32) and (33) each being upwardly opened. The grip-supporting-rod (2) can detachably engage with one of the recesses (31), (32) and (33) via the aid of the moveable element (21) to adjust the inclination of said grip-supporting-rod(2).

Figure 4:
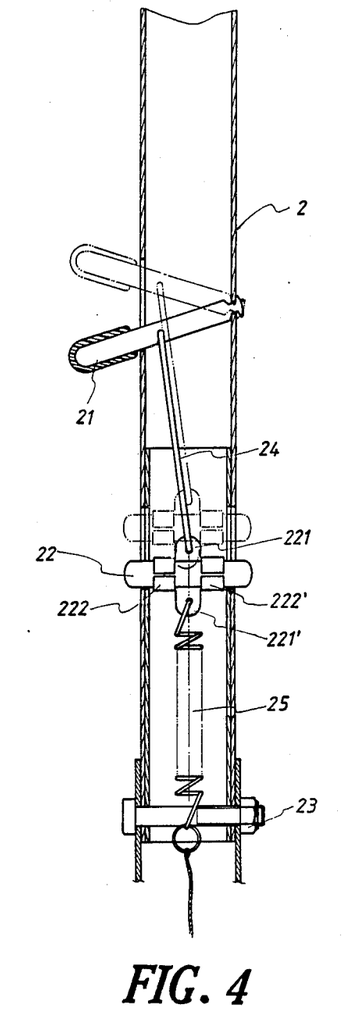
FIG. 4 is a cross-sectional view illustrating a moveable element construction being disposed in the grip-supporting-rod.

As shown in FIG. 4, the mechanism for adjusting the inclination of the grip-supporting-rod (2) mainly comprises a moveable element (21), a latch pin (22), a spring (25), a screw (23) and a link (24). The moveable element (21) passes through the hollow grip-supporting-rod (2) with one end thereof projecting from said rod. The protruding end of the moveable element (21) is designed to move along a longitudinal slot (211) formed in the supporting rod (2). The latch pin (22) also passes through the hollow supporting rod (2) with both ends thereof projecting from the rod (2). The latch pin (22) cooperates with another longitudinal slot (223) to move therealong such that the latch pin (22), when moving downward, can engage with one of the recesses (31), (32) and (33) and when moving upward, can disengage from the recesses (as shown in FIG. 3). The central portion of the latch pin is formed with a pair of opposite projections (221) and (221'). A pair of clamping sleeves (222) and (222') are located between each of the projections (221) and (221') and the inner wall of the handle supporting rod (2) to maintain the latch pin (22) in proper position when sliding up and down. The moveable element (21) is connected with the latch pin (22) by the link (24) while the latch-pin (22) is connected with the screw (23) by the spring (25). Therefore, the latch pin (22) can be moved upward when the moveable element (21) is actuated upward by the external force. As soon as the external force is removed, the latch pin (22) will return to its original position with the aid of the restoring force furnished by the spring (25). The longitudinal slots (211) and (223) of the grip-supporting-rod (2) are designed to limit the travel of the moveable element (21) and the latch pin (22). This may prevent the spring (25) from being over pulled.

Figure 5:
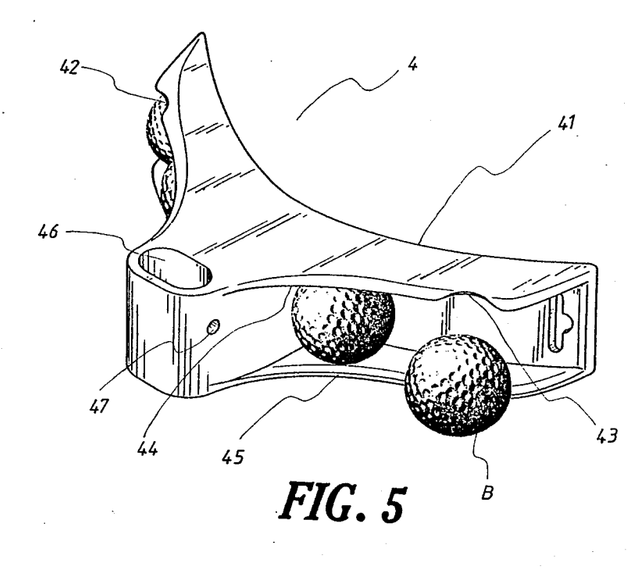
FIG. 5 is a perspective view of an upper-fixing-member for holding a golf bag in accordance with the present invention.

Referring to FIG. 5, the upper-fixing-member (4) is generally V-shaped. The front edge (41) of the upper-fixing-member is arcuate to securely hold a golf bag from its upper end. Each wing of the upper-fixing-member (4) extends on the rear side so as to include a top plate and bottom plate and form a chamber therebetween. There is provided a pair of arcuate edges (44) and (45) symmetrical on each wing so as to narrow the opening of the chamber. The upper arcuate edge (44) of each wing further is provided with an arcuate recess (42) or (43) through which a golf ball (B) can be put into each said chamber. The intersection of said two wings has an aperture (46) by which the fixing member (4) can be mounted to the upper control supporting rod (9), as shown in FIG. 1. The side wall of the aperture (46) has a pin hole (47) for locating the fixing member (4).

Figure 6:
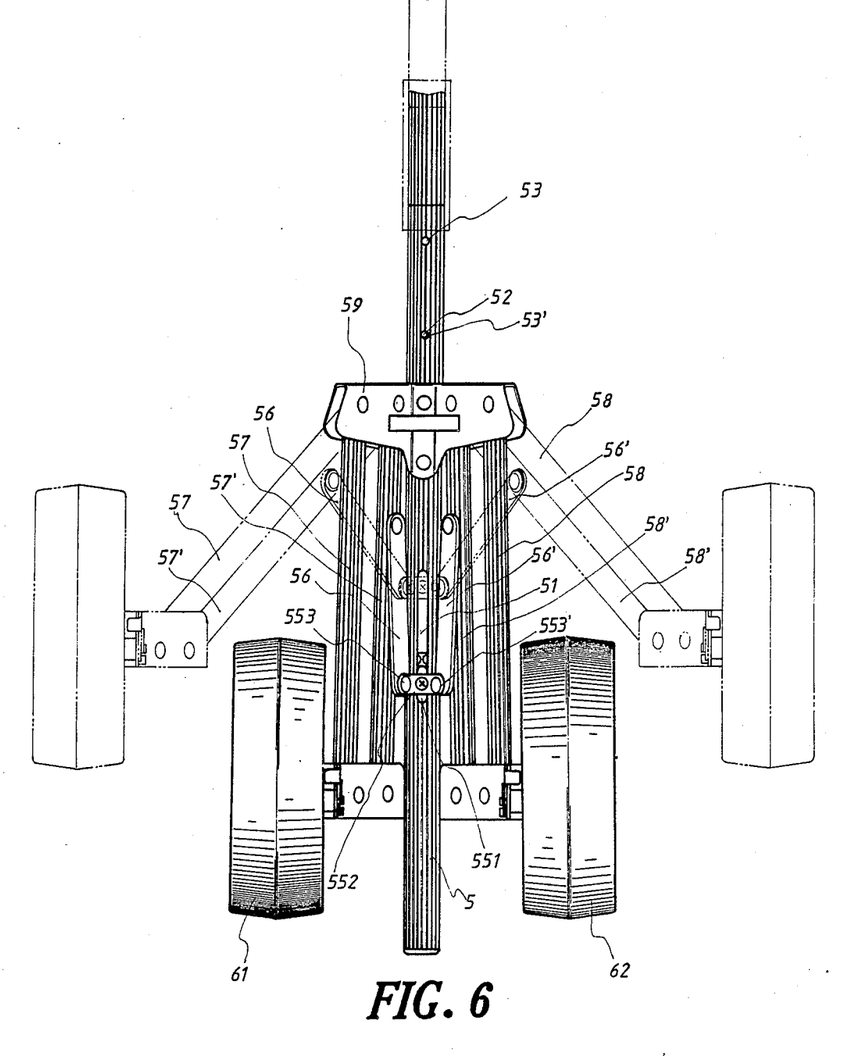
FIG. 6 is a schematic view showing a collapsible frame in accordance with the present invention.
Figure 7:
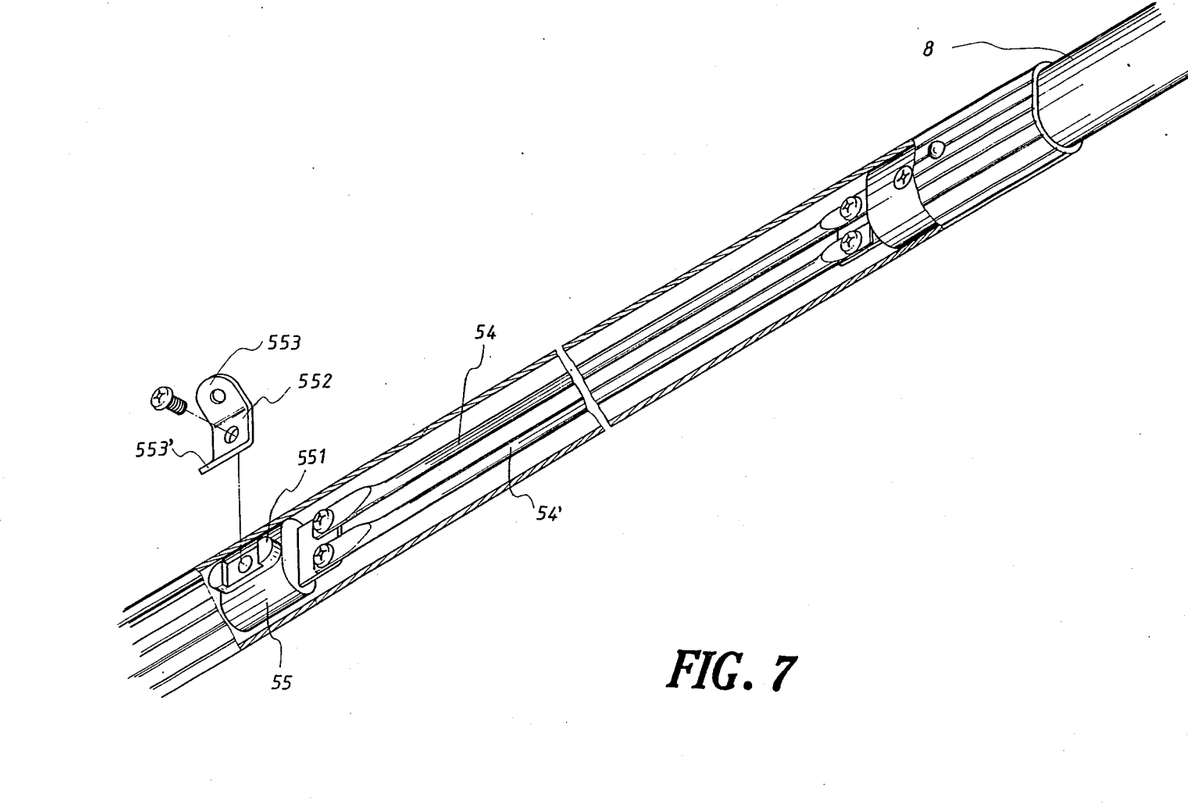
FIG. 7 is a cross-sectional view illustrating a slidable link mechanism being disposed in a lower central supporting rod.
Figure 8:
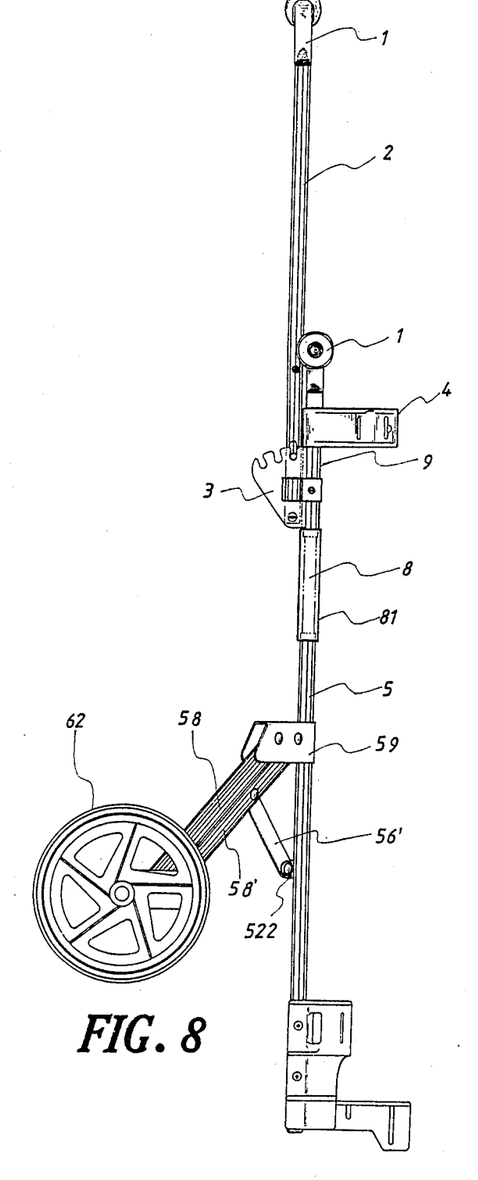
FIG. 8 is a side view of the collapsible frame in accordance with the present invention.

Referring to FIGS. 6 to 8, the collapsible frame mainly comprises a short tube (8), a lower central supporting rod (5), a set of connection pieces (56) and (56'), a connection seat (59), and a set of wheel supporting rods (57), (57'), (58) and (58'). The lower central supporting rod (5) has at its middle a sliding slot (51) (FIG. 6). The upper end of the central supporting rod (5) is furnished with a spring-loaded knob (52) which can protrude outside from either an upper positioning hole (53) or a lower positioning hole (53') or be pressed into the rod (5) where it is slidable along the inner wall of the rod. A pair of links (54) and (54') are disposed in the hollow central supporting rod (5) in such a manner that one end of each link is connected with the short tube (8) and the other end thereof is connected with a slidable element (55). The slidable element (55) has a positioning block (551) which can freely slide along the sliding slot (51). The positioning block (551) is joined with a joining piece (552) having a pair of inclined extensions (553) and (553') at both of its sides. One end of each of the connection pieces (56) and (56') is connected to each of said inclined extensions (553) and (553') of said joining piece (552). The other end of each of said connection pieces (56) and (56') is connected with one of the wheel supporting rods (57), (57'), (58) and (58'). The connection seat (59) is joined both with the lower central supporting rod (5) and with one end of each of said wheel supporting rods (57), (57'), (58) and (58').

The extension of the aforesaid collapsible frame comprises the following procedures: Firstly, press the spring-loaded knob (52) into the lower central supporting rod (5) to initiate the upward movement of the short tube (8). Then, the links (54) and (54') along with the slidable element (55) in turn are moved upward. At this instant, the joining piece (552) together with the connection pieces (56) and (56') can be moved upward. The wheel supporting rods (57), (57'), (58) and (58') can be extended outwardly as the connection pieces (56) and (56') are moved upward. Once the spring-loaded knob (52) protrudes from and engages with the upper positioning hole (53), the travel of the short tube (8) is terminated so that the wheel supporting rods (57), (57'), (58) and (58') can be fixed to the predetermined position. The upper end of the short tube (8) is inserted into the upper central supporting rod (9). A sleeve (81) encases the intersections between the short tube (8) and each of the upper and lower supporting rods (5) and (9) in order to maintain the appearance.

In collapsing, firstly press the spring-loaded knob (52) into the upper central supporting rod (5). Then, the wheel supporting rods (57), (57'), (58) and (58') can return to the original collapsed position when the spring loaded knob (52) travels to the lower positioning hole (53') and protrudes outside therefrom.

In view of the above, we can clearly see that the major components of the collapsible mechanism are disposed in the interior of the central supporting rod (5). Therefore, this built-in construction may increase the operating security and may improve the durability of components. The joining piece (552) of proper width slides stably within the sliding slot (51) of the lower central supporting rod (5) during the extension or collapse of the collapsible frame, thereby avoiding the unstable and loose operation of the conventional golf carts.

Referring to FIGS. 9 to 12, the fastening mechanism for joining the wheels (61) and (62) with the wheel supporting rods mainly comprises a metal plate assembly (63), wheels (61) and (62), a moveable element (64), a spring (65) and a pin (66). The metal plate assembly (63) is U-shaped and has a pair of vertical plates. Each vertical plate is formed with an inclined extension having an axial hole (631) and a pivotal hole (632). The upper edge of the inner inclined extension has a shallow recess (633). The axle (621) of the wheel (62) is formed with a pair of slots (6211) and (6212) and said axle (621) is arranged to pass through an axle sleeve (622) of the wheel (62). The moveable element (64) is provided at one end with a flap (645). The lower portion of the flap (645) has a recess (644). The middle of the moveable element (64) has a latch (642) and a projection (643) and the lower portion thereof has a pivotal hole (641). The pin (66) has a step-like shaft having two different diameters.

Figure 9:
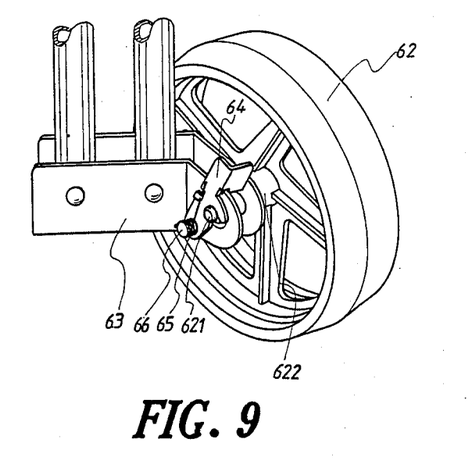
FIG. 9 is a perspective view showing a wheel being connected to supporting rods of collapsible frame by a metal plate assembly in accordance with the present invention.
Figure 10:
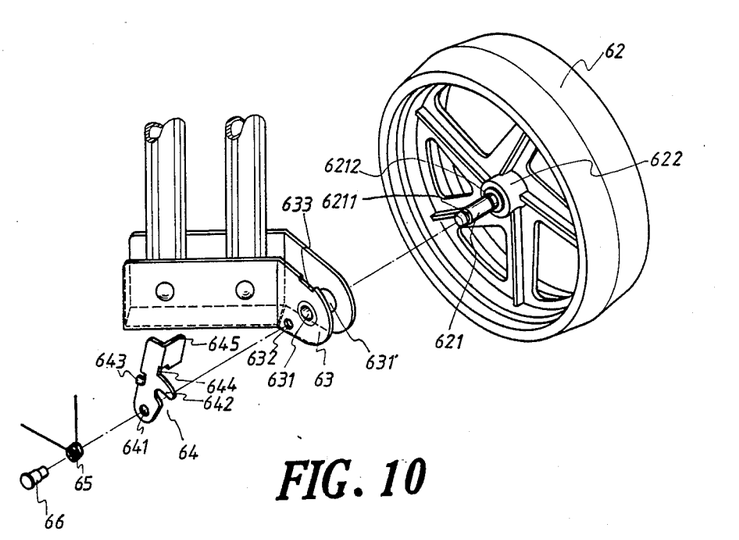
FIG. 10 is a fragmentary exploded perspective view showing the wheel, the supporting rods and the metal plate assembly as shown in FIG. 9.
Figures 11, 12:
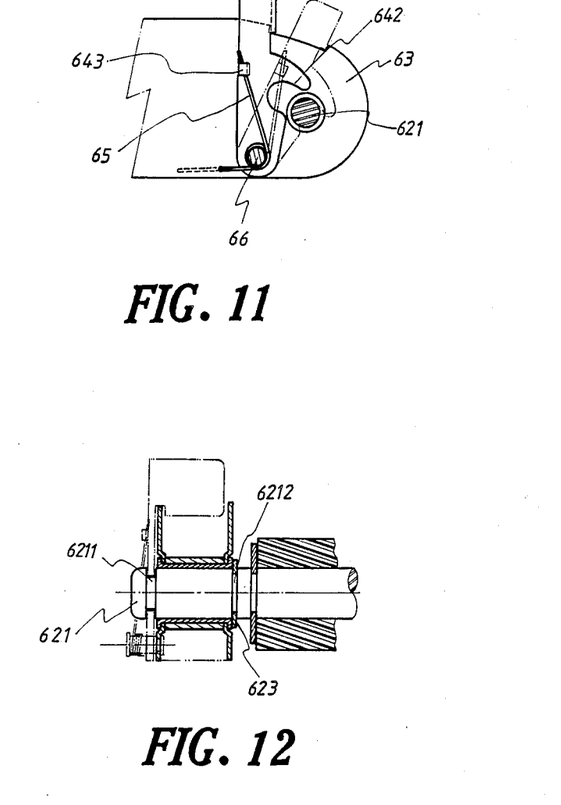
FIG. 11 is a longitudinal sectional view showing the connection between an axle and the metal plate assembly in accordance with the present invention.
FIG. 12 is a cross-sectional view showing the connection between the axle and the metal plate assembly in accordance with the present invention.

In assembly, as shown in FIG. 9, firstly, insert the axle (621) of the wheel (62) through the axial holes (631) and (631') of the metal plate assembly (63). Then, insert the pin (66) through the spring (65), the pivotal hole (641) of the moveable element (64) and the pivotal hole (632) of the metal plate assembly (63) with one end of the spring (65) being leaned on the projection (643) of the moveable element (64). The latch member (6211) of the axle (621) to secure the wheel (62) to the metal plate assembly (63). The above mentioned recess (644) of the moveable element receives the edge of the shallow recess (633). By the means of engagement between the latch member (642) and latch slot (6211), the wheel can be fastened with the metal plate assembly (63). As shown in FIG. 12, the axle (621) may have another latch slot (6212) to receive a ring member (623) such that the metal plate assembly (63) can further be fixed to its position.

As shown in FIG. 11, the latch member (642) can be disengaged from the latch slot (6211) of the axle (621) when the moveable element (64) is forced leftward. Then, the wheel (62) can be separated from the metal plate assembly (63). When released, the moveable element (64) will return to its original position by the restoring force provided by the spring (65). The length of the shallow recess (633) is designed to limit the travel of the moveable element (64) in order to prevent the spring (65) from being over compressed. In view of the aforesaid construction, we can see that the wheel can be engaged with or disengaged from the metal plate assembly by the adjustment of the moveable element (65). Thus, such an arrangement can simplify the construction and thus reduce the cost. In addition, the length of the axle of the wheel is within the scope of the width of the wheel. Therefore, these may both minimize the volume when packaging for transportation.

Figure 13:
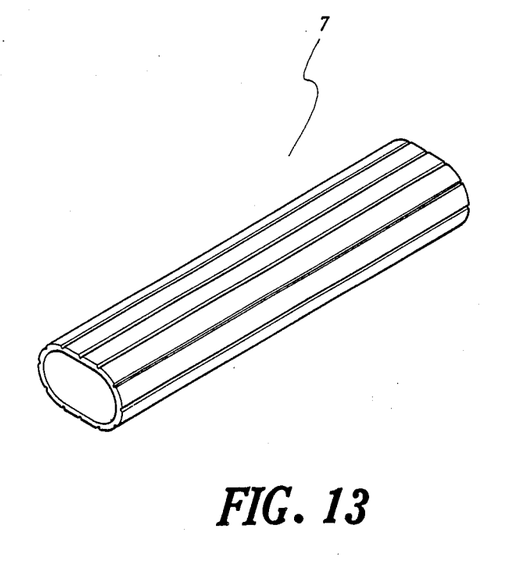
FIG. 13 is a schematic perspective view showing an extruded aluminum tube which can serve as the supporting rods of the present invention.

As shown in FIG. 13, an extruded aluminum tube (7) having elliptic cross section can preferably serve as the supporting rods of the instant golf cart.

I claim:

1. A golf cart for moving equipment used in playing the game of golf, said golf cart comprising:

(a) a frame, the frame having a lower portion and an upper end;
   (b) a pair of wheel means connected to the lower portion of said frame;
   (c) an upper central supporting rod mounted on the upper end of said frame, the upper central supporting rod having a lower portion;
   (d) a fixing seat attached to the lower portion of the upper central supporting rod by attachment means, the fixing seat having a lower portion, and said fixing seat having a plurality of upwardly presented spaced apart recesses on an upper surface of the fixing seat and pivot means on the lower portion of the fixing seat;
   (e) a grip supporting rod with latching means, the grip supporting rod having an upper end and a lower end, the lower end of said rod attached to the pivot means on the fixing seat for a variable angle of inclination of the grip supporting rod relative to the upper central supporting rod, said angle being adjustable by operating the latching means to align the grip supporting rod with any selected recess on the fixing seat; and
   (f) a grip mounted on the upper end of the grip supporting rod.

2. The golf cart of claim 1 wherein the attachment means for attaching the fixing seat to the lower portion of the upper central supporting rod is a sleeve.

3. The golf cart of claim 1 wherein the pivot means on the fixing seat is a screw.

4. The golf cart of claim 3 wherein the latching means on the grip supporting rod comprise:
   biasing means connected to the screw on the fixing seat;
   a latch pin connected to the biasing means, said latch pin designed to engage any one of the recesses on the fixing seat;
   a link connected to the latch pin; and
   a movable element connected to the link, said movable element capable of being moved upward by manual action thereby causing the link and the latch pin connected to the link to be pulled up out of any one recess against the action of the biasing means, permitting the grip supporting rod to be pivoted about the screw into alignment with a selected other recess, whereupon the movable element may be moved downward, thereby allowing the biasing means to pull the latch pin down into the selected other recess, repeated up and down movement of the movable element thus constituting operation of the latching means for varying the angle of inclination of the grip supporting rod relative to the upper central supporting rod of the golf cart.

5. The golf cart of claim 4 where the biasing means is a spring.

6. The golf cart of claim 5 wherein the grip supporting rod is of hollow cross-section with two sets of longitudinal slots in the rod circumference, the movable element protruding through the first set of slots and therethrough moving up and down, and the latch pin protruding through the second set of slots and therethrough moving up and down.

7. A golf cart for moving equipment used in playing the game of golf, said golf cart comprising:

(a) a frame, the frame having a lower portion and an upper end;
   (b) a pair of wheel means connected to the lower portion of said frame;
   (c) an upper central supporting rod mounted on the upper end of said frame, the upper central supporting rod having an upper portion and a lower portion;

(d) a fixing seat attached to the lower portion of the upper central supporting rod;

(e) a grip supporting rod attached to the fixing seat, the grip supporting rod having an upper end;

(f) a grip mounted on the upper end of the grip supporting rod; and (g) an upper fixing member for supporting a golf bag attached to the upper portion of the upper central supporting rod, the upper fixing member comprising:
  (i) attachment means,
  (ii) a front edge,
  (iii) a pair of outwardly projecting wings forming a generic Vee, each wing having an upper plate, a lower plate and a sidebar, with the sidebar, upper plate and lower plate in each wing forming a chamber therebetween sized to receive at least one golf ball, and
  (iv) a recess in the upper plate of each wing for inserting the golf balls, and edges along the upper plate and lower plate of each wing for retaining the golf balls once they are inserted.

8. The golf cart of claim 7 wherein the attachment means in the upper fixing member comprise:
  an aperture through which the upper central supporting rod is inserted and
  a pin hole into which a pin is inserted for securing the upper fixing member to the upper central supporting rod.

9. The golf cart of claim 7 wherein the front edge, recesses in the upper plates, and edges along the upper plates and along the lower plates of the upper fixing member are all arcuate in shape.

10. A golf cart for moving equipment used in playing the game of golf, said golf cart comprising:
  (a) a frame, the frame having a lower portion and an upper end;
  (b) a pair of wheel means connected to the lower portion of said frame, each wheel means comprising:
    (i) a metal plate assembly of U-shape connected to the lower portion of said frame, said U-shape comprising two vertical plates as the side pieces of the U-shape, each of the vertical plates having an axle hole, and one plate only also having a first pivotal hole;
    (ii) a movable element having a latch member, a projection, a flap with a recess, spring means, and a second pivotal hole, said movable element being connected to the metal plate assembly by a pin inserted through both the first pivotal hole and the second pivotal hole, and
    (iii) a wheel with an axle, said axle formed with a slot, the releasable attachment of the wheel to the metal plate assembly being achieved by inserting the axle through the mating axle holes in the two vertical plates, when the latch member of the movable element urged by the bias of the spring means engages the slot on the axle, which attachment may be released by manually moving the latch member pivotally in the direction opposing the spring means bias to disengage the latch member from the sot and so allow removal of the axle and wheel;
  (c) an upper central supporting rod mounted on the upper end of said frame, the upper central supporting rod having a lower portion;
  (d) a fixing seat attached to the lower portion of the upper central supporting rod;
  (e) a grip supporting rod attached to the fixing seat, the grip supporting rod having an upper end; and
  (f) a grip mounted on the upper end of the grip supporting rod.

11. The golf cart of claim 10 wherein the lower portion of said frame comprises a pair of sets of wheel supporting rods, with each wheel supporting rod having a lower end, and wherein the metal plate assembly in each wheel means is attached to one of said pair of sets of wheel supporting rods at the lower ends of said rods.

12. The golf cart of claim 11 wherein the spring means in the movable element of each wheel means is a linear spring anchored in said projection and wound around the circumference of the pin.

13. The golf cart of claim 12 wherein the axle in each wheel means also has a second slot which receives a ring member to further fix the metal plate assembly in position on the axle.

14. A golf cart for moving equipment used in playing the game of golf, said golf cart comprising:
  (a) a frame, the frame having a lower portion and an upper end;
  (b) a pair of wheel means connected to the lower portion of said frame;
  (c) an upper central supporting rod mounted on the upper end of said frame, the upper central supporting rod having an upper end, and upper portion, and a lower portion;
  (d) a fixing seat attached to the lower portion of the upper central supporting rod;
  (e) a grip supporting rod attached to the fixing seat, the grip supporting rod having an upper end;
  (f) a first grip of a pair of grips mounted on the upper end of the grip supporting rod, said grip comprising:
    (i) a horizontal handle portion for gripping by the golf cart user, the handle portion having a free end,
    (ii) a semi-spherical socket at the free end of said handle portion, said socket having a partially enclosed chamber sized to releasably retain a golf ball, and
    (iii) a plurality of flexible fingers extending from the semi-spherical socket over the partially enclosed chamber, the flexible fingers being capable of releasably holding a golf ball within said socket;
  (g) an upper fixing member for supporting a golf bag attached to the upper portion of the upper central supporting rod; and
  (h) a second grip of a pair of grips mounted on the upper end of the upper central supporting rod above the upper fixing member, said grip comprising:
    (i) a horizontal handle portion for gripping by the golf cart user, the handle portion having a free end,
    (ii) a semi-spherical socket at the free end of said handle portion, said socket having a partially enclosed chamber sized to releasably retain a golf ball, and (iii) a plurality of flexible fingers extending from the semi-spherical socket over the partially enclosed chamber, the flexible fingers being capable of releasably holding a golf ball within said socket.

15. The golf cart of claim 14 wherein the first grip and the second grip of a pair of grips further comprise a U-shaped body.

16. The golf cart of claim 15 wherein the U-shaped body is provided with a plurality of holes sized to retrievably receive golf tees.

17. The golf cart of claim 15 wherein said first grip further comprises a vertical insert portion attached to the U-shaped body, said insert portion being used to mount said first grip on the upper end of the grip supporting rod.

18. The golf cart of claim 15 wherein said second grip further comprises a vertical insert portion attached to the U-shaped body, said insert portion being used to mount said second grip on the upper end of the upper central supporting rod.

19. A golf cart for moving equipment used in playing the game of golf, said golf cart comprising:
(a) a spring-assisted collapsible frame comprising:
(i) a lower central supporting rod of hollow cross-section with an axial sliding slot in the rod wall, the lower central supporting rod having an upper portion,
(ii) a short tube slidably mounted within the upper portion of the lower central supporting rod, the short tube having an upper portion,
(iii) a slidable link mechanism connected to the lower central supporting rod for extending and collapsing the golf cart;
(b) a pair of wheel means connected to the slidable link mechanism of said frame;
(c) an upper central supporting rod mounted on the upper portion of the short tube of said frame, the upper central supporting rod having a lower portion;
(d) a fixing seat attached to the lower portion of the upper central supporting rod;
(e) a grip supporting rod having a lower end and an upper end, and attached at its lower end to the fixing seat; and
(f) a grip mounted on the upper end of the grip supporting rod.

20. The golf cart of claim 19 wherein the slidable link mechanism of said frame comprises:
(a) a slidable element with a positioning block within the lower central supporting rod, element able to slide along the sliding slot in said rod wall;
(b) a pair of links, each having an upper end and a lower end, with their upper ends connected to the short tube and their lower ends connected to the slidable element;
(c) a connection set rigidly attached to the lower central supporting rod;
(d) a pair of sets of wheel supporting rods, each rod having an upper end, all said rods in the pair at their upper ends pivotally attached to the connection seat; and
(e) a pair of connection pieces, each connection piece having two ends, each said connection piece at one end pivotally attached to one rod in one set of wheel supporting rods and at the other end pivotally attached to the slidable element within the lower central supporting rod, such that the two sets of wheel supporting rods are movable outwardly away from the lower central supporting rod in an extending movement when the short tube is manually pulled upward along the lower central supporting rod, thereby pulling upward the pair of links, the slidable element and the pair of connection pieces, and conversely, the two sets of wheel supporting rods are movable inwardly toward the lower central supporting rod in a collapsing movement when the short tube is manually pulled downward along the lower central supporting rod.

21. The golf cart of claim 20 wherein the lower central supporting rod of said frame further comprises:
a spring-loaded knob in the wall of said rod;
a upper positioning hole; and
a lower positioning hole, said knob being capable of being pressed into said rod and sliding along the inner wall surface of said rod or of protruding outside through either the upper or the lower positioning hole, whereby the extended frame configuration is achieved by pressing said knob into said rod and initiating the upward movement of the short tube until said knob engages and protrudes from the upper positioning hole to terminate the upward travel of the short tube, and, conversely, the collapsed frame configuration is achieved by pressing said knob into said rod and initiating the downward movement of the short tube until said knob engages and protrudes from the lower positioning hole to terminate the downward travel of the short tube.

22. A golf cart for moving equipment used in playing the game of golf, said golf cart comprising:
(a) a spring-assisted collapsible frame, the frame having a lower portion and an upper end, and the frame comprising:
(i) a lower central supporting rod of hollow cross-section having an upper portion, the lower central supporting rod having an axial sliding slot in the rod wall, a spring-loaded knob, an upper positioning hole and a lower positioning hole,
(ii) a short tube slidably mounted within the upper portion of the lower central supporting rod, and
(iii) a slidable link mechanism connected to the lower central supporting rod for extending and collapsing the golf cart comprising:
(A) a slidable element with a positioning block within the lower central supporting rod, said element able to slide along the sliding slot in said rod wall,
(B) a pair of links each having an upper end and a lower end, with the upper ends connected to the short tube and their lower ends connected to the slidable element,
(C) a connection seat rigidly attached to the lower central supporting rod,
(D) a pair of sets of wheel supporting rods, each rod having an upper end and a lower end, all said rods in the pair at their upper ends pivotally attached to the connection seat, and
(E) a pair of connection pieces, each connection piece having two ends, each said connection piece at one end pivotally attached to one rod in one set of wheel supporting rods and at the other end pivotally attached to the slidable element within the central lower supporting rod, such that the two sets of wheel supporting rods are movable outwardly away from the lower central supporting rod in an extending movement when the short tube is manually pulled upward along the lower central supporting rod, thereby pulling upward the pair of links, the slidable element and the pair of connection pieces, the upward travel of the short tube being terminated when the spring-loaded knob in the wall of the lower central supporting rod is engaged in the upper positioning hole, and conversely, the two sets of wheel supporting rods are movable inwardly toward the lower central supporting rod in a collapsing movement when the short tube is manually pulled downward along the lower central supporting rod, the downward travel of the short tube being terminated when said spring-loaded knob is engaged in the lower positioning hole;

(b) a pair of wheel means connected to the lower portion of said frame, each wheel means comprising:
  (i) a metal plate assembly of U-shape, attached to one of a pair of sets of wheel supporting rods at the lower ends of said rods, having two vertical plates as the side pieces of the U-shaped, each of the vertical plates having an axle hole, and one plate only also having a first pivotal hole,
  (ii) a movable element having a latch member, a projection, a flap with a recess, and a second pivotal hole, said movable element being connected to the metal plate assembly by a pin inserted through both the first pivotal hole and the second pivotal hole, with a linear spring anchored in the projection and would around the pin circumference to bias the movable element, and
  (iii) a wheel with an axle, said axle formed with a slot, the releasable attachment of the wheel to the metal plate assembly being achieved by inserting the axle through the mating axle holes in the two vertical plates, when the latch member of the movable element urged by the spring bias engages the slot on the axle, which attachment may be released by manually moving the latch member pivotally in the direction opposing the spring bias to disengage the latch member from the slot and so allow removal of the axle and wheel;

(c) an upper central supporting rod mounted on the short tube at the upper end of said frame, the upper central supporting rod having an upper end, an upper portion, and a lower portion;

(d) a fixing seat attached to the lower portion of the upper central supporting rod by a sleeve, the fixing seat having a lower portion, said fixing seat having a plurality of upwardly presented spaced apart recesses on an upper surface of the fixing seat and a pivot screw on its lower portion;

(e) a grip supporting rod having a lower end and an upper end, with its lower end pivotally attached to the screw of the fixing seat for a variable angle of inclination of the grip supporting rod relative to the upper central supporting rod, the grip supporting rod comprising:
  (i) a spring connected to the screw pivot on the fixing seat,
  (ii) a latch pin connected to the spring, said latch pin designed to engage any one of the recesses on the fixing seat,
  (iii) a link connected to the latch pin, and
  (iv) a movable element connected to the link, said movable element able to be moved upward by manual action thereby causing the link and latch pin connected to the link to be pulled up out of any one recess against the biasing force of the spring, permitting the grip supporting rod to be pivoted about the screw into alignment with a selected other recess, whereupon the movable element may be moved downward, thereby allowing the spring to pull the latch pin down into the selected other recess, repeated up and down movement of the movable element thus selected changes in the angle of inclination of the grip supporting rod;

(f) a first grip of a pair of grips mounted on the upper end of the grip supporting rod, said grip comprising:
  (i) a horizontal handle portion for gripping by the golf cart user, the handle portion having a free end,
  (ii) a semi-spherical socket at the free end of the handle portion, said socket having a partially enclosed chamber sized to releasably retain a golf ball,
  (iii) a plurality of flexible fingers extending from the semi-spherical socket over the partially enclosed chamber, the flexible fingers being capable of releasably holding a golf ball within said socket,
  (iv) a U-shaped body attached to said handle portion, the U-shaped body having a plurality of holes, each designed to receive a golf tee, and
  (v) a vertical insert portion adjoining the U-shaped body to mount said grip on the upper end of the grip supporting rod:

(g) an upper fixing member for supporting a golf bag attached to the upper portion of the upper central supporting rod, the upper fixing member comprising:
  (i) an aperture through which the upper central supporting rod is inserted.
  (ii) a pin hole into which a pin is inserted for securing the upper fixing member to the upper central supporting rod,
  (iii) an arcuate front edge,
  (iv) a pair of outwardly projecting wings forming a Vee, each wing having an upper plate, a lower plate and a sidebar, with the sidebar, upperplate and lower plate in each wing forming a chamber therebetween sized to receive at least one golf ball,
  (v) an arcuate recess in the upper plate of each wing for inserting the golf balls, and
  (vi) arcuate edges along the upper plate and lower plate of each wing for retaining the golf balls once they are inserted; and (h) a second grip of a pair of grips on the upper end of the upper central supporting rod above the upper member, said grip comprising:
  (i) a horizontal handle portion for gripping by the golf cart user, the handle portion having a free end,
  (ii) a semi-spherical socket at the free end of the handle portion, said socket having a partially enclosed chamber sized to releasably retain a golf ball, (iii) a plurality of flexible fingers extending from the semi-spherical socket over the partially enclosed chamber, the flexible fingers being capable of releasably holding a golf ball within said socket, (iv) a U-shaped body attached to said handle portion, the U-shaped having a plurality of holes, each designed to receive a golf tee, and (v) a vertical insert portion adjoining the U-shaped body to mount said grip on the upper end of the upper central supporting rod.

* * * * *